(12) United States Patent
Gong (10) Patent No.: US 9,042,127 B2
(45) Date of Patent: May 26, 2015

(54) LED POWER SUPPLY

(71) Applicant: Infineon Technologies Austria AG, Villach (AT)

(72) Inventor: Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 155 days.

(21) Appl. No.: 13/839,115

(22) Filed: Mar. 15, 2013

(65) Prior Publication Data

US 2014/0268918 A1 Sep. 18, 2014

(51) Int. Cl.
*H02M 3/335* (2006.01)
*H02M 7/217* (2006.01)

(52) U.S. Cl.
CPC .................................... *H02M 7/217* (2013.01)

(58) Field of Classification Search
USPC .......... 363/21.05, 21.08–21.13, 21.16–21.18, 363/78, 79, 96, 97
See application file for complete search history.

(56) References Cited

U.S. PATENT DOCUMENTS

| | | | |
|---|---|---|---|
| 5,729,443 A | 3/1998 | Pavlin | |
| 6,707,283 B1 | 3/2004 | Ball | |
| 6,721,192 B1 | 4/2004 | Yang et al. | |
| 6,853,563 B1 | 2/2005 | Yang et al. | |
| 7,388,764 B2 | 6/2008 | Huynh et al. | |
| 7,505,287 B1 | 3/2009 | Kesterson | |
| 7,525,259 B2 | 4/2009 | Weirich | |
| 7,990,740 B1 * | 8/2011 | Notohamiprodjo et al. | .... 363/59 |
| 8,111,050 B2 * | 2/2012 | Sutardja et al. | ............... 323/207 |
| 2007/0035285 A1 | 2/2007 | Balakrishnan et al. | |
| 2008/0259656 A1 | 10/2008 | Grant | |
| 2009/0059632 A1 | 3/2009 | Li et al. | |
| 2009/0073725 A1 | 3/2009 | Lin | |
| 2011/0199793 A1 * | 8/2011 | Kuang et al. | ............... 363/21.13 |

OTHER PUBLICATIONS

Contenti, C. et al., "Analysis of Different Solutions and Trade-off Cost vs. Power Factor Performance for Electric Ballasts," Application Note AN-1073, International Rectifier, Dec. 9, 2004, 14 pages.
"Design Guidelines for Quasi-Resonant Converters Using FSCQ-series Fairchild Power Switch (FPS™)," Application Note AN4146, Rev. 1.0.1, Fairchild Semiconductor Corporation, Sep. 20, 2005, 24 pages.

* cited by examiner

*Primary Examiner* — Adolf Berhane
*Assistant Examiner* — Gary Nash
(74) *Attorney, Agent, or Firm* — Slater & Matsil, L.L.P.

(57) ABSTRACT

A method can be used for controlling the switching operation of a switching power converter that includes a semiconductor switch coupled in series to an inductor. The switching power converter consumes an input current from a power supply and provides an output current to a load. In each switching cycle a switch-on time instant is detected for the semiconductor switch. The semiconductor switch is closed thus enabling, at the detected switch-on time instant, the input current passing through the semiconductor switch. The semiconductor switch is opened after a desired on-time, during which the input current rises from zero to a peak value, has passed. A time interval is detected, in which the instantaneous output current is not zero. A first value that represents the peak of the input current is obtained during the on-time.

23 Claims, 4 Drawing Sheets

Fig. 5   $(i_{REF}(\theta)=V_{REF}(\theta)/R_{INT})$

Fig. 6

Fig. 7     $(i_{REF}(\theta)=V_{PKCS}(\theta)/R_{INT})$

US 9,042,127 B2

LED POWER SUPPLY

TECHNICAL FIELD

The present disclosure relates to a switched mode power supply with a high power factor and including an output current control for efficiently driving LEDs.

BACKGROUND

Since their commercial appearance in the 1960's, Light Emitting Diodes (LED) have become ubiquitous in electronic devices. Traditionally, LED light output was ideal for indicator applications but insufficient for general illumination. However, in recent years a great advance in the development of high-intensity LEDs has occurred. These new LEDs operate at much higher current levels than their predecessors (350 milliamps to several amperes compared to the 10-50 milliamp range for traditional LEDs). These new power LEDs produce sufficient output current to make them practical as sources of illumination.

Presently, the high cost of the new power LEDs renders them best suited for applications where the unique characteristics of LEDs (ruggedness, long life, etc.) compensate for the extra expense. However, the cost of these high power LEDs continues to fall while efficiency (luminous flux generated per unit of electrical power consumed) continues to rise. Predictions are that in the near future, LEDs will be the source for general illumination, preferred over incandescent, florescent lamps or the like.

LEDs are a type of semiconductor device requiring direct current (DC) for operation. Since the electrical power grid delivers alternating current (AC), a line-powered device must convert the AC to DC in order to power the LEDs. Another increasingly common requirement for line-operated equipment is power factor correction (PFC, also referred to as "power factor control"). Devices which are capable of power factor correction are able to maximize the efficiency of the power grid by making the load "seen" by the power grid appear (approximately) purely resistive thus minimizing the reactive power. The efficiency of resistive loads arises from the unvarying proportionality between the instantaneous voltage and the instantaneous current.

Furthermore, LEDs are current driven rather than voltage driven devices. Therefore, the driver circuit usually regulates the load current of the LED device more precisely than the voltage supplied to the device terminals. The need for current regulation imposes special considerations in the design of LED power supplies since most power supplies are designed to regulate output voltage. Indeed, the design of the majority of integrated circuits (IC) commercially available for controlling power supplies is for voltage regulation.

For safety, it is desirable for the output of the power circuit (connected to the LEDs) to include galvanic isolation from the input circuit (connected to the utility power grid). The isolation averts possible current draw from the input source in the event of a short circuit on the output and should be a design requirement. Usually, optocouples are used to galvanically isolate a feedback signal representing the regulated output current from the input circuit of the power supply circuit. The power conversion is accomplished by using a transformer.

Another design goal for the conversion from the incoming AC line power to the regulated DC output current may be accomplished through a single conversion step which is controlled by one switching power semiconductor. A one-step conversion maximizes circuit efficiency, reduces cost, and raises overall reliability. Switching power conversion in the circuit design is necessary but not sufficient to satisfy the one-step conversion requirement while capitalizing on the inherent efficiency.

There is a need for a LED power supply circuit that provides a high power factor as well as a regulated output current while not requiring any feedback signals to be tapped at the current output. Thus, optocouplers or similar components, which are usually employed for transmitting the current feedback signal back to the input circuit while providing a galvanic isolation, can be omitted.

SUMMARY OF THE INVENTION

In the present disclosure a method for controlling the switching operation of a switching power converter is described. The switching power converter comprises a semiconductor switch coupled in series to an inductor, consumes an input current from a power supply, and providing an output current to a load. In accordance with a first aspect of the invention the method the semiconductor switch is regularly switched on and off. In each switching cycle of the semiconductor switch a switch-on time instant is detected for the semiconductor switch. The semiconductor switch is closed at the detected switch-on time instant, thus enabling the input current passing through the semiconductor switch. The semiconductor switch is opened after a desired on-time, during which the input current rises from zero to a peak value, has passed. A time interval is detected, in which the instantaneous output current is different from zero. A first value is obtained that represents the peak of the input current during the on-time, and a first signal is generated which has the first value during the detected time interval and is zero otherwise. The first signal is averaged thus providing an averaged signal which is an estimation of the average output current. The desired on-time is adjusted such that the averaged first signal approximately matches a pre-defined target value.

Further a switching power converter is described. In accordance with a further aspect of the invention the switching power converter includes an inductor and a semiconductor switch, which is coupled in series to the inductor. An input current operably passes through the inductor dependent on the switching state of the semiconductor switch. An output current is provided at an output terminal, which is coupled to the inductor. The output current depends on the input current. The switching power converter further includes a voltage sense circuit that is configured to sense the voltage across the semiconductor switch at least when the semiconductor switch is in an off-state. The voltage sense circuit provides a feedback signal that represents the sensed voltage across the semiconductor switch. A current sense circuit is provided which senses the input current passing through the semiconductor switch and provides a current sense signal that represents the input current passing through the semiconductor switch. A control circuit controls the switching operation of the semiconductor switch. The control circuit that is configured to detect a switch-on time instant for the semiconductor switch and to close the semiconductor switch at the detected switch-on time instant, thus enabling the input current passing through the semiconductor switch and through the inductor. The control circuit that is further configured to (re-) open the semiconductor switch after a desired on-time, during which the input current rises from zero to a peak value, has passed, and to detect a time interval, in which the instantaneous output current is different from zero. Moreover, the control circuit obtains a first value that represents the peak of the input current during the on-time and generates a first signal which has the first value during the detected time interval and is zero otherwise. The first signal is averaged, wherein the averaged signal is an estimation of the average output current. The control circuit is further configured to adjust the desired on-time such that the averaged first signal approximately matches a pre-defined target value.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings.

DETAILED DESCRIPTION OF ILLUSTRATIVE EMBODIMENTS

The examples discussed below relate to switched mode power supplies (SMPS) that provide a high power factor (i.e., the input current is (approximately) proportional to the (rectified) AC input voltage) and, furthermore, an estimation of the mean output current, which enables controlling (regulating) the actual mean output current without the need for a direct measurement of the output current. The estimation may be accomplished based on the switched inductor current and the voltage drop across the power switch, which switches the inductor current on and off. As a direct measurement of the output current is not required a galvanic isolation between the power supply and the load may be easily accomplished (with some power converter topologies) which may be an important security feature in some applications. The mentioned output current control makes the SMPS particularly suitable for driving light emitting diodes (LEDs) with high luminous output for energy-saving illumination purposes. Despite the possibility of achieving a high power factor, it should be noted that the SMPS circuits discussed herein may also be supplied with a DC input voltage which may be the case, for example, in automotive applications. In such applications power factor is not an issue but, however, the mentioned regulation of the mean output current may still be important to ensure a defined luminous intensity of the connected LEDs. In the following description a flyback converter is used as an illustrative example of a switching power converter. However, in some applications a flyback converter may be replaced, e.g., by a floating buck converter. Many aspects of the present invention may be applied to various power converter topologies.

Figure 1:
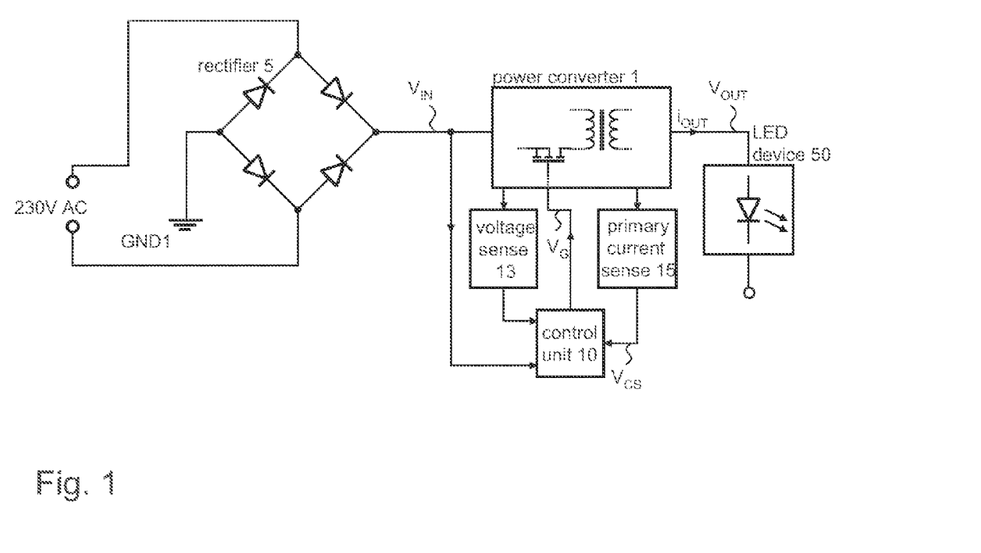
FIG. 1 illustrates the basic structure of a LED power supply circuit arrangement including output current control using a flyback topology.

FIG. 1 illustrates the basic structure of a LED power supply circuit arrangement in accordance to one example of the present invention. The circuit arrangement comprises a switching power converter 1 which is a flyback converter in the present example. However, a floating buck converter may also be used in an alternative example. In case of a flyback converter the switching power converter comprises a primary side and a secondary side which are galvanically isolated by a transformer, having a primary winding $L_P$ and a secondary winding $L_S$ (see also FIG. 2). The primary winding $L_P$ has $N_P$ turns and the secondary winding has $N_S$ turns. In case of a buck converter a single inductor L is used instead of the transformer.

The primary winding $L_P$ of a flyback converter 1 or, in case of a buck converter, the inductor L is coupled to a rectifier 5 that is configured to rectify an alternating line voltage supplied by, for example, the power grid. Thus the (rectified) input voltage $V_{IN}$ applied to the switching power converter 1 substantially has a rectified sine waveform. The secondary winding $L_S$ of the flyback converter 1 or, in case of a buck converter, the inductor L is coupled to a load, i.e., the LED device 50, for supplying output power thereto. The any type of switching power converter further includes a power semiconductor switch $T_1$ for controlling the current flow through the primary winding $L_P$ (denoted as primary current $i_P$) or, respectively, through the inductor L. That is, the semiconductor switch $T_1$ is configured to switch the primary current $i_P$ on and off in accordance with a respective control signal $V_G$. The circuit arrangement further includes a current sense unit 15 that provides a current sense signals $V_{CS}$ representing the primary current $i_P$ through the primary winding $L_P$ (or the inductor L in case of a buck converter). The circuit arrangement further includes a control unit 10, that generates the control signal $V_G$ supplied to the semiconductor switch $T_1$. The terms primary current and secondary current usually relate to a transformer having a primary (input) and a secondary (output) side. In case of a buck converter, which only has a single inductor, the terms primary current and secondary current are also used herein to denote the input and the output current of the buck converter.

Generally, the control unit 10 controls the switching operation of the switching power converter 1. In the present example, the control unit 10 is configured to control the switching power converter such that it operates in a quasi-resonant (i.e., self-oscillating) mode. For this purpose the control unit 10 may be further configured to compare the current sense signal $V_{CS}$ with a reference signal, e.g., a reference voltage $V_{REF}$. Then, the control signal $V_G$, which controls the switching state of the semiconductor switch $T_1$, is set to switch the primary current $i_P$ off when the primary current sense signal $V_{CS}$ (e.g., $V_{CS}=R_{CS} \cdot i_P$) equals or exceeds the reference signal $V_{REF}$. In quasi-resonant mode the semiconductor switch $T_1$ is, for example, switched on when the voltage (e.g., the drain-source voltage in case of a MOSFET) across the switch $T_1$ is at a (local) minimum. For this purpose the circuit arrangement may comprise a voltage sense unit 13 for direct or indirect monitoring of the voltage drop across the semiconductor switch $T_1$ during the time it is switched off. This allows the detection of the time instant when the voltage across the switch $T_1$ is at a minimum. Thus the switching losses and the electromagnetic emissions are minimized. As mentioned above, the "trigger" to switch the primary current off may be the primary current $i_P$ reaching or exceeding a threshold signal (e.g., $V_{REF}/R_{CS}$). Alternatively, the switch-off of the primary current $i_P$ may be time-triggered. In this case the on-time of the semiconductor switch is directly controlled. Both alternatives have substantially the same effect. In essence, setting the current threshold for the primary current may be regarded as indirectly setting the on-time of the semiconductor switch. However, in the following example the first alternative will be discussed in more detail.

Figure 2:
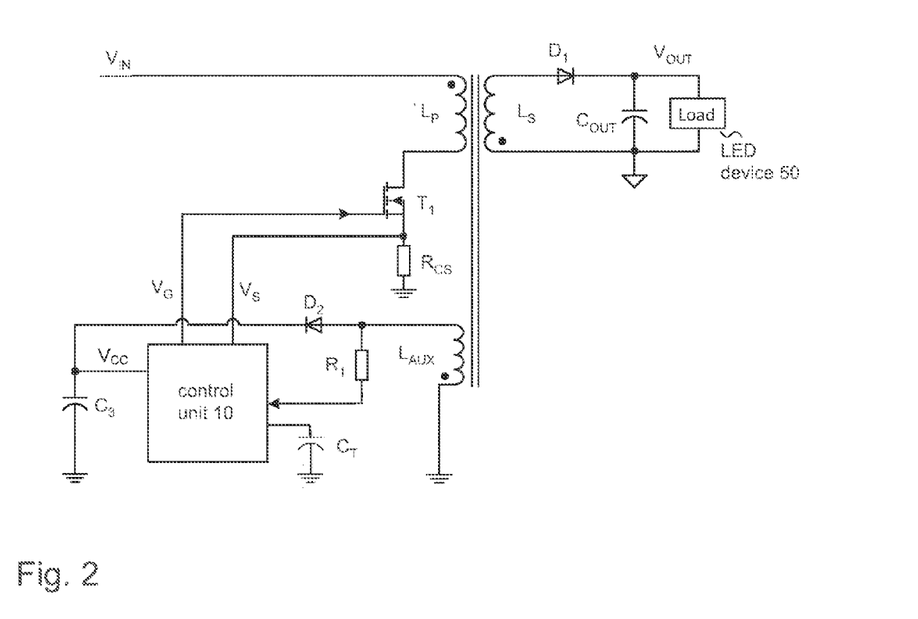
FIG. 2 illustrates the example of FIG. 1 in more detail.

FIG. 2 illustrates one exemplary implementation of the basic structure of FIG. 1 in more detail, wherein the switching power converter 1 is a flyback converter. The LED device 50 may comprise several light emitting diodes connected in series such that the overall forward voltage of the LED device is between about 15 and 30 volts which has to be provided as output voltage $V_{OUT}$ by the flyback converter 1. This output voltage is provided by buffer capacitor $C_{OUT}$ (output capacitor) which is coupled parallel to a series circuit including the secondary winding $L_S$ of the transformer and the flyback diode $D_1$. Energy is transferred from the primary side to the secondary side of the transformer in the time intervals during which the primary current $i_P$ is switched off. During the same time interval the buffer capacitor $C_{OUT}$ is charged via the flyback diode $D_1$ by the induced current flowing through the secondary winding $L_S$.

The primary winding $L_P$ is connected between an output of the rectifier 5 that provides the rectified line voltage $V_{IN}$ and the semiconductor switch $T_1$ which controls the current flow (primary current $i_P$) through the primary winding L. In the present example, the semiconductor switch $T_1$ is a MOSFET coupled between the primary winding $L_P$ and the ground terminal providing ground potential GND1. A current sense resistor $R_{CS}$ (also referred to as shunt resistor) may be connected between the source terminal of the MOSFET $T_1$ and the ground terminal such that the voltage drops $V_{CS}$ across the current sense resistor $R_S$ represents the primary current $i_P$, i.e., $V_{CS} = R_{CS} \cdot i_P$. It should be noted, that the current sense resistor $R_{CS}$ is just one exemplary implementation of the current sense unit 15 illustrated in FIG. 1. Any other known current measurement method and related circuits are applicable as well. The voltage drop $V_{CS}$ across the current sense resistor $R_{CS}$ is provided as current sense signal to the control unit 10 which generates the control signal $V_G$ supplied to the control terminal of the semiconductor switch (i.e., the gate electrode in case of a MOSFET) for controlling the switching state thereof.

When the semiconductor switch $T_1$ is switched on, the primary current $i_P$ starts to rise and the energy E stored in the primary winding $L_P$ increases. Since the flyback diode $D_1$ is reverse biased during this phase of "charging" the inductance of the primary winding $L_P$, the primary winding $L_P$ behaves like a singular inductor and the energy E stored in the primary winding equals $E = L_P \cdot i_P^2/2$, wherein $L_P$ denotes the inductance of the primary winding in that equation. When the primary current $i_P$ is switched off by the semiconductor switch $T_1$ the flyback diode $D_1$ becomes forward biased and the energy E is transferred to the secondary winding $L_S$, whereby the secondary current $i_S$ resulting from the voltage induced in the secondary winding $L_S$ charges the output capacitor $C_{OUT}$. The operating principle of the control unit 10 according to which the time instants are determined when the semiconductor switch $T_1$ switches on and off will be explained later. However, the design of quasi-resonant flyback converters is well known in the art (see, e.g., Fairchild Semiconductor, "Design Guidelines for Quasi-Resonant Converters Using FSCQ-series Fairchild Power Switch," in AN4146).

For detecting the time instances, when to switch the primary current on, an auxiliary winding $L_{AUX}$ (having $N_{AUX}$ turns) may be magnetically coupled to the primary winding $L_P$ (as well as to the secondary winding). A first terminal of the auxiliary winding $L_{AUX}$ is coupled to the ground terminal GND1 whereas a second terminal of the auxiliary winding $L_{AUX}$, which provides a feedback voltage $V_{FB}$, may be coupled to the control unit 10 via a resistor $R_1$. The auxiliary winding $L_{AUX}$ may further be used for providing a supply voltage $V_{CC}$ to the control unit 10 by means of a supply circuit (which is composed of buffer capacitor $C_3$ and the rectifier diode $D_2$). When the primary current $i_P$ is switched off, the voltage across the auxiliary winding $L_{AUX}$ rises such that the rectifier diode $D_2$ is forward-biased and thus allows for charging the buffer capacitor $C_3$. However, such a supply circuit is well known in present flyback converters (and other switching power converters) and will not be further discussed here.

In order to control the output voltage $V_{OUT}$ or the output current of the power converter a respective feedback signal (representing the output voltage or current, respectively) may be fed back to the control unit 10. In order to provide a proper galvanic isolation, optocouplers are usually used in the feedback loop. To simplify the overall switched mode power supply (SMPS) circuit, so called "primary side control" concepts have been developed, according to which the output voltage (or current) to be regulated is estimated using measurements accomplished solely on the primary side of the flyback converter. Particularly, the secondary current $i_S$ and the output voltage $V_{OUT}$ may be observed (i.e., estimated) from the measured values of the primary current $i_P$ and the feedback voltage $V_{FB}$ obtained from the auxiliary winding $L_{AUX}$.

Figure 3:
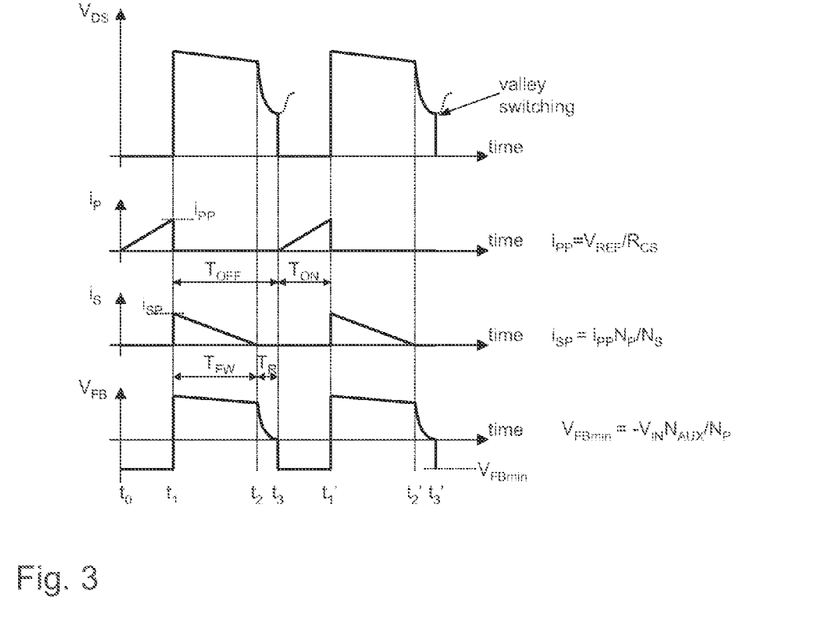
FIG. 3 is a timing diagram illustrating some waveforms of signals occurring in the circuit of FIG. 2 during two switching cycles.

FIG. 3 illustrates the basic function of the flyback converter by means of timing diagrams showing exemplary waveforms of the voltage drop $V_{DS}$ across the semiconductor switch $T_1$ (e.g., the drain-source voltage), the primary current $i_P$, the secondary current $i_S$, and the feedback voltage $V_{FB}$ across the auxiliary winding $L_{AUX}$. Assuming the transformer is demagnetized at time $t_0$ (analogous at time $t_3$) and the semiconductor switch $T_1$ is switched on. As a result the voltage $V_{DS}$ across the switch $T_1$ drops to zero and the primary current starts to ramp up with a rate $di_P/dt = V_{IN}/L_P$, while the secondary current $i_S$ is zero as a result of the reverse biased flyback diode $D_1$. When, at time instant $t_1$, the primary current reaches a predefined peak value $i_{PP}$ (which may be defined by the reference signal $V_{REF}$, so that $i_{PP} = V_{REF}/R_{CS}$) the semiconductor switch $T_1$ is switched off (at time instants $t_1$ and $t_1$') and, as a consequence, the primary current $i_P$ drops to zero. However, the energy $E(t_1) = L_P \cdot i_{PP}^2/2$ stored in the primary winding $L_P$ is not lost but rather transferred to the secondary side of the transformer causing a secondary current $i_S$ having its peak value $i_{SP}$ at $t_1$, wherein $$E(t_1) = L_P \cdot i_{PP}^2/2 = L_S \cdot i_{SP}^2/2. \tag{1}$$

The peak value $i_{SP}$ of the secondary current $i_S$ may be concluded from equation 1, that is $i_{PP}^2 \cdot L_P = i_{SP}^2 \cdot L_P$ which is equivalent to $$i_{SP} = i_{PP} \cdot N_P/N_S. \tag{2}$$

Between time instant $t_1$ and $t_2$ the secondary current drops from its peak value $i_{SP}$ to zero at a rate $di_S/dt = (V_{OUT} + V_D)/L_S$, wherein $V_{OUT}$ is the output voltage provided by the flyback converter and $V_D$ is the voltage drop across the forward biased diode $D_1$ (see FIG. 2). The resulting output current charges the output capacitor $C_{OUT}$ and supplies the load 50. Inserting the relation between the primary peak current and the reference voltage ($i_{PP} = V_{REF}/R_{CS}$) into equation 2 yields $$i_{SP} = (N_P/N_S) \cdot V_{REF}/R_{CS}. \tag{3}$$

One can see from equation 3 that the secondary peak current $i_{SP}$ can be calculated from the reference voltage $V_{REF}$, the turns ratio $N_P/N_S$ of the transformer and the resistance $R_{CS}$ of the current sense resistor. It should be noted that equation 3 represents an idealized situation in which leakage inductance is neglected and the voltage drop due to the line resistance is zero. Further, the switching times are assumed to be zero, i.e., the switching operation is very fast as compared to the length of a switching cycle.

Resuming the discussion of FIG. 3, the voltage drop $V_{DS}$ across the semiconductor switch $T_1$ rises to its maximum at time instant $t_1$ when the switch $T_1$ is switched off as mentioned above. The switch $T_1$ remains switched off even after time instant $t_2$, at which the secondary current $i_S$ reaches zero and at which the voltage $V_{DS}$ starts ringing. In quasi-resonant mode the switch $T_1$ is switched on again when the voltage $V_{DS}$ reaches a minimum at time instant $t_3$. Consequently, the voltage $V_{DS}$ drops to zero again at time instant $t_3$ and the switching cycle starts over again. The time instants $t_1'$, $t_2'$, and $t_3'$ illustrated in FIG. 3 correspond to the time instants $t_1$, $t_2$, and $t_3$ of the previous switching cycle. The off-time is denoted as $T_{OFF}=t_3-t_1$, and the on-time is denoted as $T_{ON}=t_1'-t_3$. The waveform of the feedback voltage $V_{FB}$, which can be measured at the auxiliary winding $L_{AUX}$, has the same shape as the waveform of the voltage $V_{DS}$. As compared to $V_{DS}$ the feedback voltage $V_{FB}$ has, however, a negative offset so that $V_{FB}$ is zero at time instant $t_3$. Thus, in quasi-resonant mode the switching time $t_3$ can be determined by detecting the zero crossing of the feedback voltage $V_{FB}$. During the off-time period $T_{OFF}$, the time interval, which the secondary current $i_S$ requires to drop to zero, is denoted as $T_{FW}$ ($T_{FW}=t_2-t_1$), whereas the time interval, during which the secondary current $i_S$ remains zero before the primary current $i_P$ is switched on again, is denoted as $T_R$ ($T_R=t_3-t_2$). The average secondary current is denoted as $i_{SA}$ and may be calculated as:

$$i_{SA}=(N_P/N_S)\cdot i_{PP}\cdot 0.5\cdot T_{FW}/(T_{ON}+T_{OFF}), \quad (4)$$

or $$i_{SA}=(N_P/N_S)\cdot(V_{REF}/R_{CS})\cdot 0.5\cdot T_{FW}/(T_{ON}+T_{FW}+T_R). \quad (5)$$

The time interval $T_R$ depends on the inductance of the primary winding and the capacitance of the switch $T_1$ which together form a resonant circuit. Finally, the input voltage $V_{IN}$ can be derived from the feedback voltage $V_{FB}$. When the semiconductor switch $T_1$ has been switched on (e.g., at time instants $t_3$ and $t_3'$) the voltage $V_{DS}$ across the switch $T_1$ falls to zero and the feedback voltage across the auxiliary winding $L_{AUX}$ falls to $V_{FBmin}=-V_{IN}\cdot N_{AUX}/N_P$, and thus $$V_{IN}=-V_{FBmin}\cdot N_P/N_{AUX}. \quad (6)$$

The calculation of the input voltage $V_{IN}$ in accordance with equation 6 is also based on the same idealizing assumptions as mentioned above with respect to equation 3.

Figure 4:
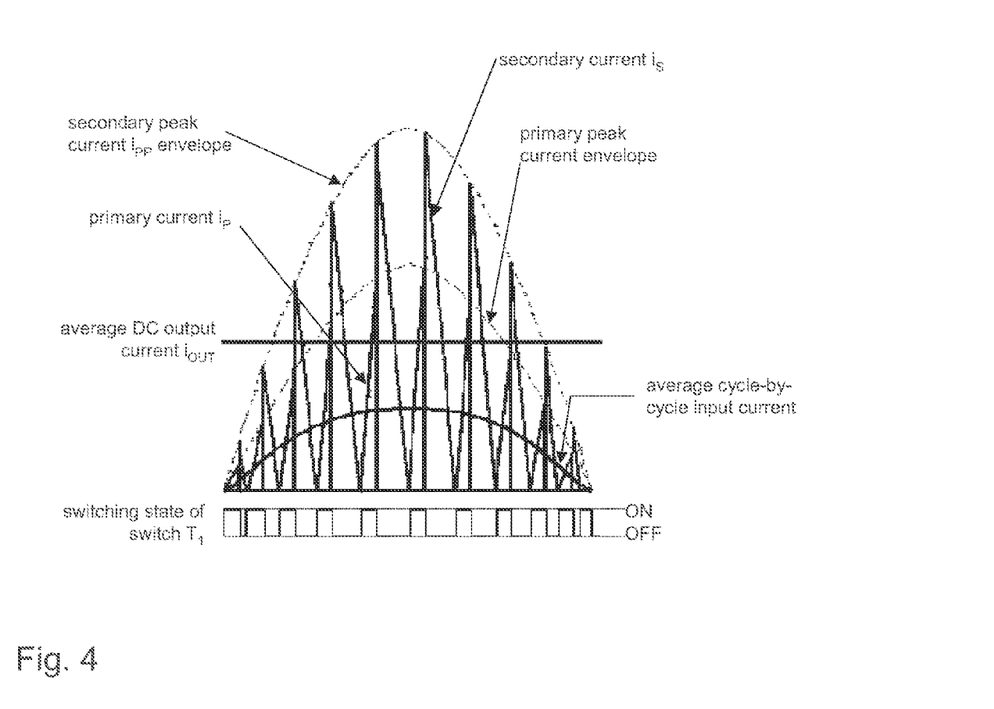
FIG. 4 illustrates a timing diagram illustrating several switching cycles throughout one period of the AC input voltage.

The timing diagram of FIG. 4 illustrates how power factor correction is accomplished to obtain a high power factor close to unity (i.e., 100 percent). Generally, a high power factor is achieved when the phase lag between the sinusoidal input voltage $V_{IN}$ (which has a rectified sine waveform) and the corresponding input current is close to zero. That is, the input voltage can be expressed as $V_{INP}\cdot|\sin(\omega\cdot t)|=V_{INP}\cdot|\sin(\theta)|$, wherein $V_{INP}$ is the amplitude (about 325V for a line voltage of 230V RMS), $\omega$ denotes the angular frequency of the line voltage ($100\pi$ rad/s in case of a 50 Hz AC voltage), and t is the variable time. As the following considerations are independent of the actual AC frequency, the phase angle $\omega t$ may be substituted by the phase angle $\theta$ which is considered in the interval $[0, \pi]$. For a high power factor the input current, i.e., the primary current $i_P$, should—on average—be proportional to the input voltage $V_{IN}$. That is, the average primary current (averaged over one switching cycle of the semiconductor switch $T_1$) $i_{PA}$ should be proportional to $\sin(\theta)$.

The timing diagram of FIG. 4 includes the waveforms of the primary current $i_P$ and the secondary current $i_S$ as well as the corresponding envelopes $i_{PENV}$ and $i_{SENV}$ which may be expressed as $$i_{PENV}(\theta)=i_{PKp}\cdot\sin(\theta), \text{ for } \theta\in[0,\pi], \quad (7)$$

and $$i_{SENV}(\theta)=i_{PKs}\cdot\sin(\theta), \text{ for } \theta\in[0,\pi], \quad (8)$$

wherein $i_{PKp}$ and $i_{PKs}$ are the respective peak values (amplitudes) of the envelopes. FIG. 4 also includes the corresponding waveform representing the cycle-by-cycle average of the primary current $i_{PA}$ mentioned above as well as the average DC output current $i_{OUT}$ which is supplied to the LED(s). It should be noted that the waveforms depicted in FIG. 4 are desired waveforms to achieve a high power factor. In order to actually achieve such waveforms the above-mentioned reference signal $V_{REF}$ (which triggers the switch-off of the primary current $i_P$ when $i_P=V_{REF}/R_{CS}$ (see FIG. 2)) should also follow the sinoidal waveform of the input voltage, i.e., $V_{REF}$ should also be proportional to $\sin(\theta)$. FIG. 4 also illustrates the switching state (on and off) of the switch $T_1$, and one can see that the time $T=T_{ON}+T_{FW}+T_R$ also depends on the phase angle, thus further referred to as $T(\theta)$.

From equations (2), (3), and (8) it follows that $$i_{SENV}(\theta)=(N_P/N_S)\cdot i_{PENV}=(N_P/N_S)\cdot i_{PKp}\cdot\sin(\theta). \quad (9)$$

For regulating the average DC output current $i_{OUT}$, which is supplied to the LED(s), the cycle-to-cycle average secondary current $i_{SA}$ is considered. It is also dependent on $\theta$ and can be calculated as follows:

$$i_{SA}(\theta)=(\tfrac{1}{2})\cdot i_{SENV}(\theta)\cdot T_{FW}(\theta)/T(\theta)=(N_P/N_S)\cdot(\tfrac{1}{2})\cdot i_{PKp}\cdot (T_{FW}(\theta)/T(\theta))\cdot\sin(\theta). \quad (10)$$

The "long-time" average of the secondary current, i.e. the output current $i_{OUT}$, may be calculated by integrating $I_{SA}(\theta)$ over the interval $[0, \pi]$. Accordingly, the average output current $i_{OUT}$ may be calculated as $$i_{OUT} = \overline{i_{SA}(\theta)} \quad (11)$$
$$= \frac{1}{2\pi}i_{PKp}\frac{N_P}{N_S}\int_0^\pi \frac{T_{FW}(\theta)}{T(\theta)}\sin(\theta)d\theta$$

The goal of the output current control is to regulate the value $i_{OUT}$ to remain at a constant desired value, independent from the output voltage $V_{OUT}$, the RMS value of the input voltage $V_{IN}$ and the switching frequency $f_{SW}=T(\theta)^{-1}$, while ensuring a sinusoidal shape of the cycle-to-cycle average primary current $i_{PA}$ (i.e,. the input current) to achieve a high power factor. The amplitude $i_{PKp}$ of the primary peak current envelope can be set by appropriately setting the peak value $V_{PKREF}$ of the reference voltage $$V_{REF}(\theta)=V_{PKREF}\cdot\sin(\theta). \quad (12)$$

Thus, the amplitude $V_{PKREF}$ may be continuously adjusted such that the average output current $i_{OUT}$ is maintained at a desired constant value ($V_{TARGET}/R_{CS}$). Before explaining the average current regulation in more detail, one exemplary implementation of the control circuit 10 is discussed below with reference to FIG. 5. This control circuit 10 may be used, for example, in the power conversion circuit illustrated in FIG. 2.

Figure 5:
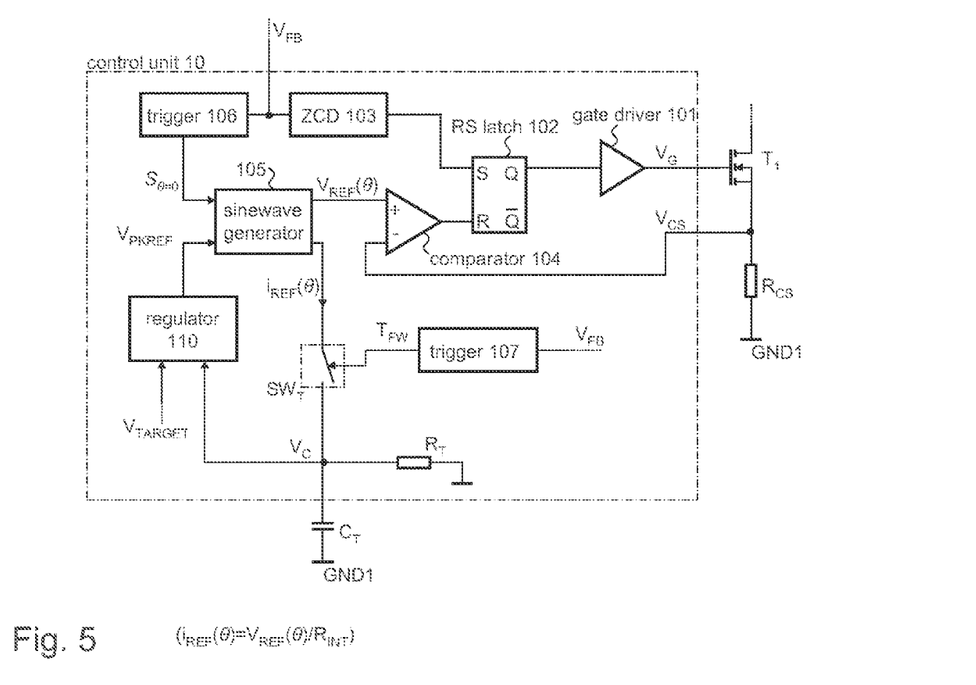
FIG. 5 illustrates one example of a control circuit to be used in the circuit of FIG. 2 in more detail.

In the example of FIG. 5 the control circuit 10 includes a gate driver 101 which generates an appropriate gate driver signal $V_G$ (i.e., a gate voltage or a gate current) for driving the gate of the transistor $T_1$, which switches the primary current $i_P$ on and off. The gate driver 101 generates the driver signal in accordance with a binary signal ON which is, in the present example, provided by the output of a SR latch 102. That is, the output signal Q of the SR latch is supplied to the input of the gate driver 101, and the transistor $T_1$ is switched on when the SR latch 102 is set (S-input of the latch) and switched off when the SR latch 102 is reset (R-input of the latch).

The control circuit 10 is supplied with the current sense signal $V_{CS}$, which represents the primary current ($V_{CS}=R_{CS}\cdot i_P$), and with the voltage $V_{FB}$ provided by the auxiliary winding $L_{AUX}$ (see FIG. 2). As already discussed with reference to FIGS. 2 to 4, the transistor $T_1$ is switched off when the instantaneous primary current $i_P$ exceeds a threshold which is, in the present example, $V_{REF}(\theta)/R_{CS}$. Accordingly, the current sense signal $V_{CS}$ is compared with the (variable) current threshold $V_{REF}(\theta)$ and the SR latch 102 is reset when the current sense signal $V_{CS}$ reaches or exceeds the threshold $V_{REF}(\theta)$. This comparison is accomplished using a comparator 104, which receives the current sense signal $V_{CS}$ and the reference signal $V_{REF}(\theta)$. The comparator output is connected to the reset input of the SR latch 102. As a result, the primary current is switched off when the following equation holds true:

$$V_{CS} \geq V_{REF}(\theta),$$

which is equivalent with $$i_P \geq V_{REF}(\theta)/R_{CS}.$$

For a quasi-resonant switching operation the primary current is switched on (again) when the voltage across the transistor $T_1$ (e.g., the drain-source voltage $V_{DS}$) reaches a minimum. This minimum can be detected by detecting the time instant the voltage $V_{FB}$ across the auxiliary winding becomes zero (cf. time instant $t_3$ in FIG. 3). This "zero-crossing detection" is accomplished by the zero crossing detector (ZCD) 103 which receives the voltage $V_{FB}$ and provides a trigger pulse at its output which is suitable to set the SR latch 102. That is, the ZCD 103 is configured to detect a zero crossing in the voltage $V_{FB}$ and to signal such a zero crossing at its output. The output signal of the ZCD 103 is supplied to the set input of the SR latch 102. As a result, the primary current $i_P$ is switched on when a zero crossing the in voltage $V_{FB}$ is detected.

As one can see from FIG. 4 and equation (7) the envelope of the primary current $i_P$ has a sinoidal shape ($i_{PENV}(\theta)=i_{PKp}\cdot\sin(\theta)$). In order to achieve a high power factor this envelope should be in phase with the input voltage which has a rectified sine waveform. Accordingly, the reference signal $V_{REF}(\theta)$ also has a sinusoidal waveform (see equation (12)) wherein $V_{PKREF}=i_{PKp}R_{CS}$. Accordingly, the control circuit 10 includes a sine wave generator 105 which is configured to generate, as reference signal $V_{REF}(\theta)$, a sine signal $V_{PKREF}\cdot\sin(\theta)$ which is in phase with (i.e., without a phase lag with respect to) the input voltage $V_{IN}$. The (rectified) sine wave has the same frequency as the line voltage (e.g., 50 Hz or 60 Hz) and the synchronization with the line voltage $V_{IN}$ is accomplished with the trigger circuit 106, which may receive the voltage $V_{FB}$ at its input or, alternatively, a signal representing the rectified input voltage $V_{IN}$. The trigger circuit 106 may be configured to detect a zero crossing of the input voltage $V_{IN}$ (i.e., the line voltage) and to signal the beginning of a new period (of the line voltage signal) when such a zero crossing is detected. The respective trigger signal provided by the trigger circuit 106 is denoted as $S_{\theta=0}$ as it signals the time instant when the phase angle is zero ($\theta=0$). The sinewave generator 105 also receives a signal representative of the reference signal amplitude $V_{PKREF}$ (which determines the amplitude of the primary current envelope). Further, the sinewave generator 105 provides a current $i_{REF}(\theta)$ which is proportional to the reference voltage $V_{REF}(\theta)$, i.e., $i_{REF}(\theta)=V_{REF}(\theta)/R_{INT}$, wherein $R_{INT}$ denotes an internal resistance of the sinewave generator 105 which determines the proportionality between $V_{REF}(\theta)$ and $i_{REF}(\theta)$.

The remaining part of the control circuit 10 (which has not yet been described) forms a control loop, with which the reference signal amplitude $V_{PKREF}$ is adjusted such that the mean output (secondary) current matches a desired target value. This control loop may be formed by the regulator circuit 110, the averaging circuit including the capacitor $C_T$ and the resistor $R_T$, the switch $SW_T$ and the trigger circuit 107, which controls the on-time of the switch $SW_T$ such that it is closed during the time interval $T_{FW}$ (see FIG. 3). The capacitor $C_T$ is charged by the current $i_{REF}(\theta)$ while the switch $SW_T$ is closed and is discharged via the resistor $R_T$. The voltage across the capacitor $C_T$ is denoted as $V_C$. In a steady state the following charge balance holds true:

$$(V_C(\theta)/R_T)\cdot T(\theta)=i_{REF}(\theta)\cdot T_{FW}(\theta)=(V_{REF}/R_{INT})\cdot T_{FW}(\theta), \quad (13)$$

which yields by substituting $V_{REF}$ (see equation (12))

$$(V_C(\theta)/R_T)\cdot T(\theta)=(V_{PKREF}/R_{INT})\cdot\sin(\theta)\cdot T_{FW}(\theta). \quad (14)$$

The capacitance of capacitor $C_T$ is designed to be high enough that the ripple voltage (having twice the frequency of the line voltage) is negligible as compared to the DC component which is defined as:

$$V_{CAVG}=V_{PKREF}\frac{R_T}{R_{INT}}\cdot\frac{1}{\pi}\int_0^\pi \sin(\theta)\frac{T_{FW}(\theta)}{T(\theta)}d\theta. \quad (15)$$

If the mentioned control loop is successful in regulating this average capacitor voltage to match a constant target voltage ($V_{CAVG}=V_{TARGET}$) then the reference signal amplitude $V_{PKREF}$ can be expressed as:

$$V_{PKREF}=V_{TARGET}\frac{R_{INT}}{R_T}\cdot\pi\cdot\left(\int_0^\pi \sin(\theta)\frac{T_{FW}(\theta)}{T(\theta)}d\theta\right)^{-1} \quad (16)$$

Combining equations (11) and (16) yields (with $V_{PKREF}/R_{CS}=i_{PKp}$):

$$i_{OUT}=(1/2)\cdot(N_P/N_S)\cdot(R_{INT}/R_T)\cdot(V_{TARGET}/R_{CS}), \quad (17)$$

which is a constant value if $V_{TARGET}$ is constant as the integral cancels out. Again referring to the mentioned control loop included in the control circuit 10 illustrated in FIG. 5, the capacitor $C_T$ is charged during the time span $T_{FW}(\theta)$ (see FIG. 3) whereas it is discharged during the whole switching period $T(\theta)=T_{ON}(\theta)+T_{FW}(\theta)+T_R(\theta)$ of the transistor $T_1$. The charging current $i_{REF}(\theta)$ (wherein $i_{REF}(\theta)=V_{REF}(\theta)/R_{INT}$) may be also provided by the sinewave generator 105 and supplied—via the switch $SW_T$—to the capacitor $C_T$, which is connected between the sinewave generator 105 and a ground terminal GND1. The resistor $R_T$ is coupled in parallel to the capacitor $C_T$. The voltage drop $V_C$ across the capacitor is supplied to the regulator 110 which also receives the constant target voltage $V_{TARGET}$. The regulator may provide an updated amplitude $V_{PKREF}$ for the reference voltage $V_{REF}(\theta)=V_{PKREF}\cdot\sin(\theta)$ dependent on the capacitor voltage $V_C$ and the target voltage $V_{TARGET}$ in accordance with a pre-defined control law. The control law implemented in the regulator 110 may be chosen dependent on the application. A simple PI regulator (PI=proportional-integral) may be appropriate as well as a simple bang-bang-control. Alternatively, digital control may also be applicable. The trigger circuit 107 ensures that the switch $SW_T$ is only closed during the time interval $T_{FW}$ (i.e., while the secondary current $i_S$ is higher than zero). The respective trigger signal may be derived from the voltage $V_{FB}$ received from the auxiliary winding $L_{AUX}$.

Below some aspects of the method for controlling a flyback converter such to achieve a high power factor and a desired mean output current $i_{OUT}$ are summarized. The input voltage V supplied to the primary winding $L_P$ of the flyback converter 1 is a rectified sine wave having an amplitude (i.e., peak value) equalling the RMS (RMS=root mean square) line voltage times the square-root of 2 (e.g., approximately 325 V for 230 V RMS line voltage). The frequency of the sine wave corresponds to the frequency of the power grid (usually 50 Hz or 60 Hz). The flyback converter 1 may be operated in quasi-resonant mode. That is, the primary current $i_P$ passing through primary winding $L_P$ is switched on, when the voltage drop $V_{DS}$ across the power transistor $T_1$, which switches the primary current $i_P$ on and off, reaches a minimum. The primary current $i_P$ passing through primary winding $L_P$ is switched off when the primary current reaches a threshold value $V_{REF}(\theta)$. One switching cycle of the switching operation of the power transistor $T_1$ is much shorter than one period of the AC line voltage. In the example of FIG. 4 the transistor $T_1$ switches ten times during a half period of the line voltage. In practice the transistor switches even faster (40 to 100 kHz).

The threshold value $V_{REF}(\theta)$ depends on the phase angle $\theta$ which defines the (temporal) "position" within one period of the rectified line voltage, which is between 0 and $\pi$. Thus the varying threshold value $V_{REF}(\theta)$ may be seen as threshold signal which should be synchronized with the rectified line voltage (i.e., have the same frequency) wherein the phase lag between the threshold signal $V_{REF}(\theta)$ and the (rectified) line voltage should be zero for a high power factor. The peak value (i.e., the amplitude) $V_{PKREF}$ of this threshold signal may be adjustable and is tuned such that the resulting mean output current $i_{OUT}$ (which contributes to the perceivable brightness of the LEDs driven by the output current) is regulated to match a given target value $V_{TARGET}/R_{CS}$. For this purpose, a signal $V_{CAVG}$ is generated which is an estimation representing the mean output current $i_{OUT}$. This signal $V_{CAVG}$ is compared to a reference value (target value) $V_{TARGET}$. Then the amplitude $V_{PKREF}$ of the threshold signal $V_{REF}(\theta)$ is adjusted dependent on the result of this comparison. For example, if the signal $V_{CAVG}$ is higher than the reference value $V_{TARGET}$ then the amplitude $V_{PKREF}$ is decreased and, similarly, if the signal $V_{CAVG}$ is lower than the reference value $V_{TARGET}$ then the amplitude $V_{PKREF}$ is increased. In such a manner, the signal $V_{CAVG}$, which can be regarded as an estimation of the mean output current, is regulated to match the reference value $V_{TARGET}$.

It should be noted, that it is not necessary to provide an estimation of the actual secondary current $i_S$. It is sufficient, however, to provide an estimation (see equation (15)) of the mean output current $i_{OUT}$ (see equation (11)). In the exemplary circuit of FIG. 5 this is accomplished by low-pass filtering a signal (e.g., the current signal $i_{REF}(\theta)$) that is proportional to the threshold signal $V_{REF}(\theta)$ but blanked for all times except when $i_S > 0$ (which is during the time interval $T_{FW}$, see FIG. 3). The low-pass filter may be implemented by a parallel circuit of the capacitor $C_T$ and a resistor $R_T$ (see FIG. 5). The resulting average capacitor voltage $V_{CAVG}$, which is calculated in accordance with equation (15), can be regarded as mean output current estimate. The method summarized above ensures a high power factor while avoiding the requirement of direct measurements (i.e., direct measurements of the secondary side current $i_S$) at the secondary side of the flyback converter 1. The comparison of the capacitor voltage $V_{CAVG}$ and the reference value $V_{TARGET}$ may be performed once in a half-cycle of the line voltage (i.e., at $\theta=\pi$, $\theta=2\pi$, $\theta=3\pi$, etc) and the amplitude $V_{PKREF}$ of the threshold signal $V_{REF}(\theta)$ is adjusted for the following half-cycle. The output current regulation including the power factor correction as described above yields an approximately constant on-time $T_{ON}$ of the power semiconductor switch $T_1$. Thus, instead of regulating the peak value $V_{PKREF}$ of the threshold signal value $V_{REF}(\theta)$ it may be sufficient to regulate the on-time $T_{ON}$. In this case the sine-wave generator 105 may be omitted. Such an alternative embodiment is more closely described with respect to the floating buck converter illustrated in FIG. 6.

Similar to the flyback converter, the floating buck converter also matches the structure shown in FIG. 1 except that the load 50 (LED device) is connected between the switching power converter output and the supply voltage $V_{IN}$ instead of between the switching power converter output and ground. No galvanic insulation is provided in this power converter topology and thus one inductor L is sufficient (in contrast to the flyback converter of FIG. 2). When the semiconductor switch $T_1$ is closed, the diode $D_1$ is reverse biased. In this situation, the semiconductor switch $T_1$ is connected in series to the inductor L and the load 50 (LED device).

In analogy to the example of FIG. 2, the current passing through the semiconductor switch $T_1$ is referred to as input or primary current $i_P$ (however, there is no secondary side in this example). During the on-time $T_{ON}$ (see FIG. 3) the load current $i_L$ is equal to the input current $i_P$. When the semiconductor switch $T_1$ is open, the current path of the load current $i_L$ is closed via the diode $D_1$ which is connected in parallel to the series circuit of load 50 and inductor $L_1$. The diode current $i_S$ is also referred to as "secondary" current as it corresponds to the secondary current in the previous example. The current waveforms relating to the present embodiment is then the same as in the previous example and depicted in FIG. 3. In the present example, the output current $i_L$ may be regarded as a superposition of the primary and the secondary current $i_P$ and $i_S$.

While the semiconductor switch $T_1$ is open, the diode $D_1$ is forward biased and lets the output current $i_L$ pass. The load 50 has a capacitor connected in parallel which is referred to as output capacitor $C_{OUT}$. The voltage across the load 50 (and thus across the output capacitor is referred to as output voltage $V_{OUT}$). The mean current passing through the load 50 is referred to as mean output current $i_{OUT}$. The switching converter topology (i.e., the topology of a floating buck converter) is as such known and not discussed in more detail herein. However, the control circuit 10 which controls the switching operation of the floating buck converter is explained more closely below.

A (primary/input) current sense circuit 15 (see FIG. 1) is provided, which is configured to generate a current sense signal $V_{CS}$ representing the input current $i_P$ passing through the semiconductor switch $T_1$. Analogous to the example of FIG. 2 a current sense resistor $R_{CS}$ is coupled between the semiconductor switch $T_1$ and ground potential, and the voltage drop $V_{CS}$ across the current sense resistor $R_{CS}$ is used as current sense signal. However, other types of current measurement may be applicable. As in the previous examples, the semiconductor switch $T_1$ is switched on when the voltage across the semiconductor switch $T_1$ is at a minimum (referred to as "valley switching"). In the present example the voltage sense circuit 13 (see FIG. 1) may be a single capacitor coupled between the common circuit node of inductor $L_1$ and semiconductor switch $T_1$ and the respective input terminal of the control circuit 10. A capacitor $C_T$ is coupled between the control circuit 10 and ground for the same purpose as in the previous example (see capacitor $C_T$ in FIGS. 2 and 5).

The control circuit may be implemented analogous to the example described above with respect to FIG. 5. However, the above-mentioned alternative implementation, which makes use of an adjustable on-time is described below with reference to FIG. 7.

Figure 7:
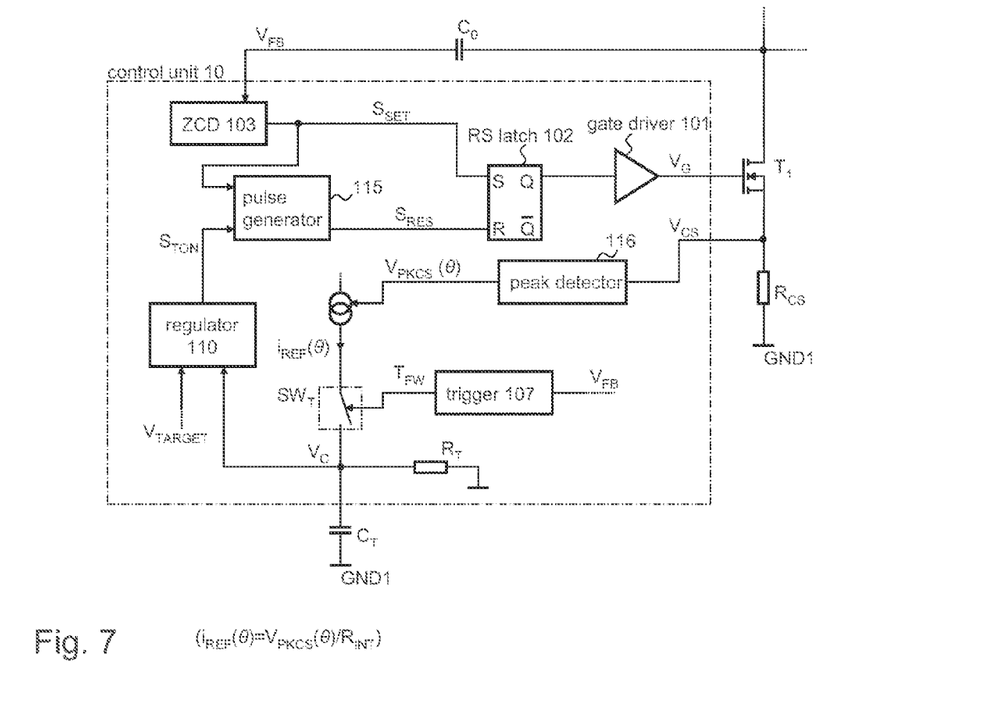
FIG. 7 illustrates one example of a control circuit to be used in the circuit of FIG. 6 in more detail.

Similar to the previous example (see FIG. 5), the control circuit 10 of FIG. 7 includes a gate driver 101 which generates an appropriate gate driver signal $V_G$ (i.e., a gate voltage or a gate current) for driving the gate of the transistor $T_1$, which switches the input current $i_P$ passing through the transistor $T_1$ on and off. The gate driver 101 generates the driver signal $V_G$ in accordance with the binary signal ON which is, as in the previous example, provided by the output of a SR-latch 102. That is, the output signal ON of the SR-latch is supplied to the input of the gate driver 101, and the transistor $T_1$ is switched on when the SR-latch 102 is set (S-input of the latch receiving the set signal $S_{SET}$) and switched off when the SR-latch 102 is reset (R-input of the latch receiving the reset signal $S_{RES}$).

Figure 6:
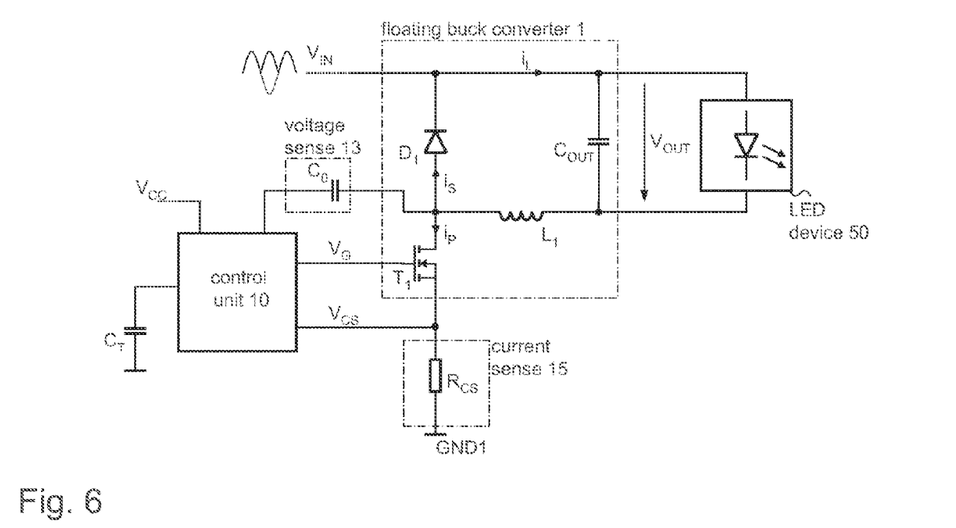
FIG. 6 illustrates example of an alternative to the example of FIG. 2 using a floating buck converter as switching converter.

The control circuit 10 also receives the current sense signal $V_{CS}$, which represents the input current ($V_{CS}=R_{CS} \cdot i_P$), and furthermore receives the voltage $V_{FB}$ present at a first terminal of the capacitor $C_0$ whose second terminal is connected with the common circuit node of inductor $L_1$ and transistor $T_1$ (see also FIG. 6). As already discussed with reference to FIG. 6, the transistor $T_1$ is switched off when a specific on-time $T_{ON}$ has elapsed. The on-time $T_{ON}$ is determined by a pulse generator 115, which receives the set signal $S_{RES}$, which also triggers activation of the SR-latch 102. The pulse generator 115 is configured to provide a reset signal $S_{RES}$ a delay time after a pulse is detected in the corresponding set signal $S_{SET}$. Basically, the pulse generator may be configured to simply delay the set signal $S_{RES}$ by a delay time that equals the desired on-time $T_{ON}$. As a result, the output of the SR-latch 102 changes to a high level (for closing the semiconductor switch $T_1$ via the gate driver 101) for the desired on-time $T_{ON}$. It should be noted, that the pulse generator 115 and the SR-latch 102 can be replaced by a mono-flop which could perform the same function.

For a quasi-resonant switching operation the primary current is switched on (again) when the voltage across the transistor $T_1$ (e.g., the drain-source voltage $V_{DS}$) reaches a minimum. This minimum can be detected by detecting the time instant at which the voltage $V_{FB}$ across the auxiliary winding becomes zero (cf. time instant $t_3$ in FIG. 3). This "zero-crossing detection" is accomplished by the zero crossing detector (ZCD) 103 which receives the voltage $V_{FB}$ and provides a trigger pulse $S_{RES}$ at its output which is suitable to set the SR-latch 102. That is, the ZCD 103 is configured to detect a zero crossing in the voltage $V_{FB}$ and to signal such a zero crossing at its output by generating a respective pulse in the output signal $S_{SET}$. The output signal (set signal $S_{SET}$) of the ZCD 103 is supplied to the set input of the SR latch 102. As a result, the primary current $i_P$ is switched on when a zero crossing in the voltage signal $V_{FB}$ is detected.

As one can see from FIG. 4 that the on-time interval during which the input current $i_P$ passes through the semiconductor switch $T_1$ is approximately constant (in-time $T_{ON}$) throughout one cycle of the (rectified) sinoidal input voltage $V_{IN}$. Accordingly, a corresponding sinusoidal envelope of the input current $i_P$ may also be achieved by closing the semiconductor switch $T_1$ for a constant time each switching cycle. As compared to the previous example of FIG. 5 the sine wave generator 105 and the trigger circuit 106 is not needed in the present example. Instead the pulse generator 115 ensures an on-time interval of an adjustable length $T_{ON}$. For this purpose the pulse generator 115 receives the signal $S_{TON}$ representing the desired on-time $T_{ON}$ (i.e., the desired delay between set signal $S_{SET}$ and resent signal $S_{RES}$).

The remaining part of the control circuit 10 (which will be described below) forms a control loop, with which the desired on-time $T_{ON}$ is adjusted (by generating an appropriate signal $S_{TON}$) such that the mean output (secondary) current matches a desired target value. This control loop is essentially the same as in the previous example of FIG. 5. Accordingly, the control loop may be formed by the regulator circuit 110, the averaging circuit including the capacitor $C_T$ and the resistor $R_T$, the switch $SW_T$ and the trigger circuit 107, which controls the on-time of the switch $SW_T$ such that it is closed during the time interval $T_{FW}$ (see FIG. 3). The capacitor $C_T$ is charged by the current $i_{REF}(\theta)$ while the switch $SW_T$ is closed, and is discharged via the resistor $R_T$. The voltage across the capacitor $C_T$ is denoted as $V_C$. In a steady state charge balance as defined in equations (13) and (14) holds true. The capacitance of capacitor $C_T$ is designed to be high enough that the ripple voltage (having twice the frequency of the line voltage) is negligible as compared to the DC component which has been defined in equation (15). If the mentioned control loop is successful in regulating this average capacitor voltage $V_{CAVG}$ to match a constant target voltage ($V_{CAVG}=V_{TARGET}$) then the average output current $i_{OUT}$ passing through the load 50 is actually regulated. Instead of the threshold signal amplitude $V_{PKREF}$, however, the on-time $T_{ON}$ is regulated which yields the same result as defined in equation (17).

Again referring to the mentioned control loop included in the control circuit 10 illustrated in FIG. 7, the capacitor $C_T$ is charged during the time span $T_{FW}(\theta)$ (see FIG. 3) whereas it is discharged during the whole switching period $T(\theta)=T_{ON}(\theta)+T_{FW}(\theta)+T_R(\theta)$ of the transistor $T_1$. The charging current $i_{REF}(\theta)$ (wherein $i_{REF}(\theta)=V_{PKCS}(\theta)/R_{INT}$) may be provided by a controllable current source Q, which is connected to the capacitor $C_T$ via the switch $SW_T$. The current $i_{REF}(\theta)$ provided by the controllable current source is determined by the peak value $V_{PKCS}(\theta)$ of the current sense signal $V_{CS}$ during one switching cycle. This peak value is determined by the peak detector 116 which receives the current sense signal $V_{CS}$ and is configured to provide the peak value $V_{PKCS}(\theta)$ which occurs during one switching cycle.

The resistor $R_T$ is coupled in parallel to the capacitor $C_T$. The voltage drop $V_C$ across the capacitor $C_T$ is supplied to the regulator 110 which also receives the constant target voltage $V_{TARGET}$. The regulator may provide an updated amplitude on-time signal $S_{TON}$ (corresponding to a time interval $T_{ON}$) dependent on the capacitor voltage $V_C$ and the target voltage $V_{TARGET}$ in accordance with a pre-defined control law. The control law implemented in the regulator 110 may be chosen dependent on the application. A simple PI regulator (PI=proportional-integral) may be appropriate as well as a simple bang-bang-control. Alternatively, digital control may also be applicable. The trigger circuit 107 ensures that the switch $SW_T$ is only closed during the time interval $T_{FW}$ (i.e., while the secondary current $i_S$ is higher than zero). The respective trigger signal may be derived from the voltage $V_{FB}$, which is also supplied to the ZCD circuit 103.

Below some aspects of the method for controlling a floating buck converter such to achieve a high power factor and a desired mean output current $i_{OUT}$ are summarized. The input voltage $V_{IN}$ supplied to the inductor $L_1$ of the floating buck converter is a rectified sine wave having an amplitude (i.e., peak value) equalling the RMS (RMS=root mean square) line voltage times the square-root of 2 (e.g., approximately 325 V for 230 V RMS line voltage). The frequency of the sine wave corresponds to the frequency of the power grid (usually 50 Hz or 60 Hz). The floating buck converter may be operated in quasi-resonant mode. That is, the input current $i_P$ passing through the power transistor $T_1$ is switched on, when the voltage drop $V_{DS}$ across the power transistor $T_1$, which switches the primary current $i_P$ on and off, reaches a minimum. The input current $i_P$ is switched off when an adjustable on-time $T_{ON}$ has elapsed. One switching cycle of the switching operation of the power transistor $T_1$ is much shorter than one period of the AC line voltage. In the example of FIG. 4 the transistor $T_1$ switches ten times during a half period of the line voltage. In practice the transistor switches even faster (40 to 100 kHz).

The on-time $T_{ON}$ of the power transistor $T_1$ may be adjustable and is tuned such that the resulting mean output current $i_{OUT}$ (which contributes to the perceivable brightness of the LEDs driven by the output current) is regulated to match a given target value $V_{TARGET}/R_{CS}$. For this purpose, a signal $V_{CAVG}$ is generated which is an estimation representing the mean output current $i_{OUT}$. This signal $V_{CAVG}$ is compared to a reference value (target value) $V_{TARGET}$. Then the desired on-time is adjusted dependent on the result of this comparison using the regulator 110. For example, if the signal $V_{CAVG}$ is higher than the reference value $V_{TARGET}$ then the on-time $T_{ON}$ may be decreased and, similarly, if the signal $V_{CAVG}$ is lower than the reference value $V_{TARGET}$ then the on-time $T_{ON}$ may be increased. In such a manner, the signal $V_{CAVG}$, which can be regarded as an estimation of the mean output current, is regulated to match the reference value $V_{TARGET}$.

It should be noted, that it is not necessary to provide an estimation of the actual output $i_S$. It is sufficient, however, to provide an estimation (see equation (15)) of the mean output current $i_{OUT}$ (see equation (11)). In the exemplary circuit of FIG. 7 this is accomplished by low-pass filtering a signal (e.g., the current signal $i_{REF}(\theta)$) that is proportional to the current sense signal $V_{CS}(\theta)$ but blanked for all times except when $i_S>0$ (which is during the time interval $T_{FW}$, see FIG. 3). The low-pass filter may be implemented by a parallel circuit of the capacitor $C_T$ and a resistor $R_T$ (see FIG. 5). The resulting average capacitor voltage $V_{CAVG}$, which is calculated in accordance with equation (15), can be regarded as mean output current estimate. The method summarized above ensures a high power factor while avoiding the requirement of direct measurements (i.e., direct measurements of the secondary current $i_S$) at the output of the floating buck converter. The comparison of the capacitor voltage $V_{CAVG}$ and the reference value $V_{TARGET}$ may be performed once in a half-cycle of the line voltage (i.e., at $\theta=\pi$, $\theta=2\pi$, $\theta=3\pi$, etc.) and the on-time $T_{ON}$ is adjusted for the following half-cycle.

The trigger circuit 107 which is used in the examples of FIGS. 5 and 7 are configured to detect the time instants $t_2$, $t_2'$ (see FIG. 3), i.e., those time instants at which the voltage across the semiconductor switch $T_1$ starts to fall. The trigger circuit 107 closes the switch $SW_T$ at time instants $t_1$, $t_1'$ (i.e., when the power transistor $T_1$ is opened), and re-opens the switch $SW_T$ when the falling edge in the feedback voltage $V_{FB}$ occurs. Thus the switch $SW_T$ is only closed during the time interval labelled $T_{FW}$ in FIG. 3 and open during the on-time $T_{ON}$ and the dead time $T_R$.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those where not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

What is claimed is:

1. A method for controlling a switching operation of a switching power converter that comprises a semiconductor switch coupled in series to an inductor, the switching power converter consuming an input current from a power supply and providing an output current to a load, wherein the method comprises in each switching cycle:
   detecting a switch-on time instant for the semiconductor switch;
   closing the semiconductor switch thus enabling, at the detected switch-on time instant, the input current passing through the semiconductor switch;
   opening the semiconductor switch after a desired on-time, during which an input current rises from zero to a peak value, has passed;
   detecting a time interval, in which an instantaneous output current is not zero;
   obtaining a first value that represents the peak of the input current during the on-time;
   generating a first signal which has the first value during the detected time interval and is zero otherwise;
   averaging the first signal thus providing an averaged signal being an estimation of an average output current; and
   adjusting the desired on-time such that the averaged first signal approximately matches a pre-defined target value.

2. The method of claim 1, wherein the desired on-time is set by setting a threshold with which the input current is compared, the desired on-time being the time span the input current needs to rise from zero to the threshold.

3. The method of claim 2, wherein adjusting the desired on-time includes adjusting the threshold with which the input current is compared.

4. The method of claim 1, wherein the desired on-time is set by generating a pulse signal having a pulse length, the desired on-time corresponding to the pulse length.

5. The method of claim 4, wherein adjusting the desired on-time includes adjusting the pulse length of the pulse signal.

6. The method of claim 1 wherein generating the first signal and averaging the first signal comprises:
   generating a first current which is proportional to the first value; and
   providing this current to a capacitor, which has a resistor coupled in parallel, during the detected time interval, a voltage across the capacitor being the averaged signal.

7. The method of claim 1 wherein adjusting the desired on-time or a desired threshold value comprises:
   comparing the averaged signal with the pre-defined target value; and
   increasing the desired on-time, when the averaged signal is lower than the pre-defined target value, and decreasing the on-time or the desired threshold value, respectively, when the averaged signal is lower than the pre-defined target value.

8. The method of claim 1 wherein detecting a switch-on time instant comprises detecting the time instant at which a voltage across the semiconductor switch becomes minimal while the semiconductor switch is open.

9. The method of claim 1 wherein detecting the time interval, in which the instantaneous output current is not zero, comprises, while the semiconductor switch is off, detecting a falling edge in a voltage drop across the semiconductor switch.

10. A switching power converter comprising:
an inductor;
a semiconductor switch coupled in series to the inductor, wherein an input current operably passes through the inductor dependent on a switching state of the semiconductor switch;
an output terminal for providing an output current, wherein the output terminal is coupled to the inductor and the output current depends on the input current;
a voltage sense circuit that is configured to sense the voltage across the semiconductor switch at least when the semiconductor switch is in an off-state and that is further configured to provide a feedback signal representing the sensed voltage across the semiconductor switch;
a current sense circuit that is configured to sense the input current passing through the semiconductor switch and that is further configured to provide a current sense signal representing the input current passing through the semiconductor switch; and
a control circuit that is configured
to detect a switch-on time instant for the semiconductor switch and to close the semiconductor switch at the detected switch-on time instant, thus enabling the input current passing through the semiconductor switch and through the inductor;
to open the semiconductor switch after a desired on-time, during which an input current rises from zero to a peak value, has passed;
to detect a time interval, in which an instantaneous output current is not zero;
to obtain a first value that represents the peak of the input current during the on-time;
to generate a first signal which has the first value during the detected time interval and is zero otherwise;
to average the first signal thus providing an averaged signal being an estimation of an average output current; and
to adjust the desired on-time such that the averaged first signal approximately matches a pre-defined target value.

11. The switching power converter of claim 10, wherein the desired on-time is set by setting a threshold with which the input current is compared, the desired on-time being the time span the input current needs to rise from zero to the threshold.

12. The switching power converter of claim 11, wherein adjusting the desired on-time includes adjusting the threshold with which the input current is compared.

13. The switching power converter of claim 10, wherein the desired on-time is set by generating a pulse signal having a pulse length, the desired on-time corresponding to the pulse length.

14. The switching power converter of claim 13, wherein adjusting the desired on-time includes adjusting the pulse length of the pulse signal.

15. The switching power converter of claim 10, wherein the control circuit comprises a circuit configured to detect a first minimum in the feedback signal after the semiconductor switch has changed into an off-state.

16. The switching power converter of claim 10, wherein a rectified line voltage is applied across the inductor and the semiconductor switch and wherein the control circuit comprises a sinewave generator that is configured to provide a sine signal that is proportional to and in-phase with the line voltage.

17. The switching power converter of claim 16, wherein the control circuit includes a comparator receiving the current sense signal and, as reference signal, the since signal, the comparator being configured to detect when the current sense signal reaches the reference signal.

18. The switching power converter of claim 17, wherein the control circuit is configured to switch off the semiconductor switch when the current sense signal has reached the reference signal.

19. The switching power converter of claim 10, wherein the control circuit comprises a current source coupled to a parallel circuit of a capacitor and a resistor and configured to provide a current to the parallel circuit that is proportional to the peak of the input current during the on-time during a time span during which the input current is not zero and zero otherwise.

20. The switching power converter of claim 19, wherein the control circuit comprises a trigger circuit that receives the feedback signal and is configured to detect the time span during which the input current is not zero.

21. The switching power converter of claim 19, wherein the control circuit comprises a regulator coupled to the parallel circuit, to receive the voltage across the capacitor and a target voltage, the regulator being configured to adjust the desired on-time dependent on a difference between the target voltage and the voltage across the capacitor.

22. The switching power converter of claim 10, wherein the inductor is the primary winding of a transformer, the transformer having a secondary winding which provides the output current.

23. The switching power converter of claim 10 wherein the switching power converter is a floating buck converter and the inductor provides the output current at the output terminal.

* * * * *